UNITED STATES PATENT OFFICE.

JACOB BRACK, OF BASLE, SWITZERLAND, ASSIGNOR TO THE SOCIÉTÉ L. DURAND, HUGUENIN & CO., OF BASLE, OF SAME PLACE.

BLUE DYE.

SPECIFICATION forming part of Letters Patent No. 497,114, dated May 9, 1893.

Application filed November 13, 1891. Serial No. 411,798. (No specimens.) Patented in France September 8, 1890, No. 208,111; in Germany September 11, 1890, No. 57,459, and in England November 17, 1890, No. 18,526.

*To all whom it may concern:*

Be it known that I, JACOB BRACK, a citizen of Switzerland, residing at Basle, Switzerland, have invented certain new and useful Improvements in the Manufacture of Coloring-Matters Obtained by the Action of Amines of the Fatty Series upon Gallocyanine, (for which I have received Letters Patent in France, dated September 8, 1890, No. 208,111; in Germany, dated September 11, 1890, No. 57,459, and in England, dated November 17, 1890, No. 18,526,) of which the following is a specification.

I have found that the amines of the fatty series such as monomethylamine, dimethylamine, trimethylamine, monoethylamine, diethylamine, monopropylamine, dipropylamine, monoisobutylamine, monoamylamine, or diamylamine can condense with the gallocyanines producing new coloring matters varying from violet to greenish blue. The condensation of the gallocyanines with monomethylamine, dimethylamine, trimethylamine, monoethylamine, monopropylamine, monoisobutylamine or monoamylamine, is easily obtained either with the aqueous solutions of the said amines or when used in their anhydrous state; while it is preferable to use the diethylamine, dipropylamine or diamylamine anhydride to obtain the reaction.

The following is an example of the manner in which my invention may be practiced:

Into a vessel placed in a water bath and provided with a suitable agitating device are introduced:—fifty kilos gallocyanine in powder (obtained from gallic acid and nitrosodimethyl-aniline-hydrochloride) and fifty kilos monomethylamine in concentrated aqueous solution or in anhydric state. The mixture is agitated for one hour at ordinary temperature. Then the whole is heated at 90° to 100° centigrade in order to complete the reaction and remove by distillation the excess of the amine which is collected in water. The dried mass is in the form of a dark brown powder and, according to the amine used, has a more or less greenish aspect.

The above named proportions are only given by way of example and may be varied, and the following variations may be made in the substances employed: Instead of gallocyanine from gallic acid, gallocyanine from tannin or its analogues, or from the methylic ether of gallic acid, may be used. Instead of the monomethylamine there may be used either in concentrated aqueous solution or in their anhydric state, either dimethylamine or trimethylamine, or monoethylamine, or monopropylamine, or monoisobutylamine or monoamylamine. Instead of the monomethylamine, there may also be used in the anhydric state, forty kilos of diethylamine or of dipropylamine or of diamylamine.

The class of products resulting from this process, as above exemplified, are nearly insoluble in water and easily soluble in alcohol and acidulated water. They dye the mordanted fibers in shades varying from violet to greenish blue. They give on chromed wool, bluer tints than gallocyanine. When printed on cotton with metallic mordants, they give shades varying from blue to greenish blue. On unmordanted wool they produce almost no shade having no affinity for this fiber when unmordanted. They produce a blue color when dissolved in concentrated sulphuric acid and colors varying from violet brown to claret in diluted sulphuric acid. A blue color is obtained in concentrated acetic acid and violets more or less bluish in diluted acetic acid. When these acid solutions are rendered alkaline by means of soda or any other alkali, a flocky precipitate is produced.

My invention being as I believe, generic and embodied in a class of products, I do not wish to be understood as limiting myself to the qualities peculiar to any individual of that class to the exclusion of the others. For example, the monomethylamine which contains only one (1) atom of carbon will give the bluer shade and the other amines will give greener shades until the greenest will be given by the amine which contains the greatest number of atoms of carbon. Thus, in the following list, the number in parentheses after each amine indicates the number of atoms of carbon it contains: monomethylamine (1), dimethylamine (2), monoethylamine (2) trimethylamine (3), monopropylamine (3), diethylamine (4,) isobuthylamine (4), monoamylamine (5), dipropylamine (6), diamylamine (10). Consequently the diamylamine will give the greenest shades of blue as compared with the other dyestuffs whatever may be the fiber on which it is compared with the other, provided that the shades obtained with all the dyestuffs are made on the same mordant or on the same fiber when compared with each other.

I claim—

1. The process for production of coloring matters consisting in the heating of an amine of the fatty series with a gallocyanine, substantially as described.

2. As an article of manufacture, a coloring matter obtainable by the condensation of an amine of the fatty series with gallocyanine which is substantially insoluble in water and soluble in acidulated water, which dyes fibers mordanted with chromium salts in shades varying from violet to greenish blue, which dyes wool mordanted with chromium salts bluer tints than gallocyanine from gallic acid and which gives shades varying from blue to greenish blue when printed on cotton with a chrome mordant, substantially as described.

In testimony that I claim the foregoing as my invention I have signed my name in presence of two subscribing witnesses.

JACOB BRACK.

Witnesses:
GEORGE GIFFORD,
CHARLES TÉTAZ.